United States Patent
Roth et al.

(10) Patent No.: US 6,813,881 B2
(45) Date of Patent: Nov. 9, 2004

(54) METHOD OF OPERATING AN INTERNAL COMBUSTION ENGINE

(75) Inventors: Andreas Roth, Muehlacker-Lomersheim (DE); Andreas Koring, Ludwigsburg (DE); Beate Rittmann, Markgroeningen (DE); Holger Bellmann, Ludwigsburg (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/204,008

(22) PCT Filed: Jan. 26, 2001

(86) PCT No.: PCT/DE01/00303

§ 371 (c)(1),
(2), (4) Date: Oct. 29, 2002

(87) PCT Pub. No.: WO01/61158

PCT Pub. Date: Aug. 23, 2001

(65) Prior Publication Data

US 2003/0115853 A1 Jun. 26, 2003

(30) Foreign Application Priority Data

Feb. 15, 2000 (DE) .......................................... 100 06 609

(51) Int. Cl.$^7$ ................................................ F01N 3/00
(52) U.S. Cl. ............................. 60/285; 60/274; 60/286; 60/284; 123/295; 123/300
(58) Field of Search ......................... 60/274, 276, 277, 60/285, 286, 284; 123/295, 300, 305, 299

(56) References Cited

U.S. PATENT DOCUMENTS

| | | | |
|---|---|---|---|
| 5,642,705 A | * 7/1997 | Morikawa et al. | .......... 123/300 |
| 5,910,096 A | 6/1999 | Hepburn et al. | |
| 5,975,046 A | * 11/1999 | Kaneko et al. | ............. 123/300 |
| 6,041,591 A | * 3/2000 | Kaneko et al. | ............... 60/274 |
| 6,345,500 B2 | * 2/2002 | Itou et al. | ..................... 60/286 |

OTHER PUBLICATIONS

H. Ando et al., "Mitsubishi GDI Engine Strategies To Meet The European Requirements", 1997, pp. 55, 57–70.

* cited by examiner

Primary Examiner—Binh Q. Tran
(74) Attorney, Agent, or Firm—Kenyon & Kenyon

(57) ABSTRACT

An internal combustion engine, in particular for a motor vehicle, in which fuel may be injected into a combustion chamber during an intake phase in a first mode of operation or during a compression phase in a second mode of operation, and in which exhaust gases may be sent to a catalytic converter. A control unit determines a temperature difference between an actual exhaust gas temperature and a setpoint exhaust gas temperature at an operating point having a low exhaust gas temperature. In addition, at least one additional injection after combustion is implemented by the control unit as a function of the temperature difference.

18 Claims, 1 Drawing Sheet

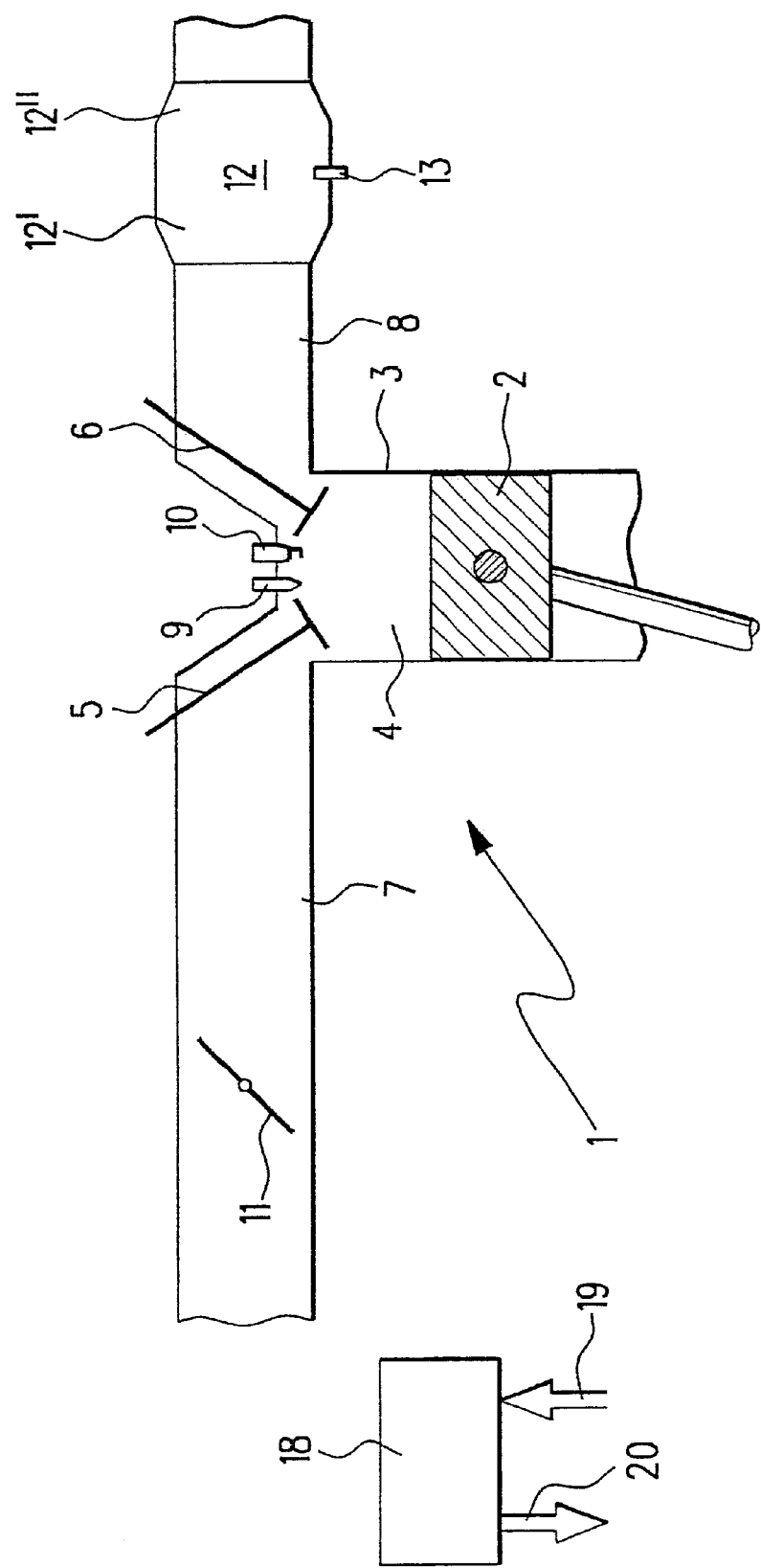

METHOD OF OPERATING AN INTERNAL COMBUSTION ENGINE

FIELD OF THE INVENTION

The present invention relates to a method of operating an internal combustion engine, in particular, a method of operating an internal combustion engine of a motor vehicle, in which fuel is injected directly into a combustion chamber of the engine during an intake phase in a first mode of operation or during a compression phase in a second mode of operation, and in which exhaust gas is sent to a catalytic converter. The present invention also relates to a control unit for an engine, and in particular, to a control unit for an engine of a motor vehicle.

BACKGROUND INFORMATION

Conventionally, in direct gasoline injections, fuel is injected into the combustion chamber of the engine during the intake phase in homogeneous operation or during the compression phase in stratified charge operation. Homogeneous operation may be provided for full-load operation of the engine, while stratified charge operation is suitable for idling and partial load operation. Such a direct injection engine is switched between these modes of operation as a function of the required torque, for example.

For conversion of exhaust gases in the catalytic converter with the engine described above, the catalytic converter typically has a specified operating temperature.

The engine may be operated at an operating point at which the exhaust gas temperature is low. Such an operating point occurs in idling operation, for example, when the engine is operated at a low idling speed.

In such idling operation, very little fuel is injected into the engine. This may result in the catalytic converter cooling down because of the low resulting exhaust gas temperature. Conversion and thus purification of the exhaust gases of the engine are then no longer guaranteed.

SUMMARY

An object of the present invention is to provide a method of operating an internal combustion engine with which adequate purification of the exhaust gases is guaranteed even at operating points having a low exhaust gas temperature.

A temperature difference between an actual exhaust gas temperature and a setpoint exhaust gas temperature is determined at an operating point having a low exhaust gas temperature, and at least one additional injection is implemented after combustion, as a function of the temperature difference. This may be performed by a control unit of an internal combustion engine.

Due to the additional injection, a combustible mixture is produced in the area of the exhaust bend or the catalytic converter. Due to the fact that the exhaust bend or the catalytic converter is still hot, this mixture is ignited and burned. The heat generated in this way prevents the catalytic converter from cooling down. The conversion capacity of the catalytic converter is maintained and purification of the exhaust gases is thus guaranteed even at operating points having a low exhaust gas temperature.

The dependence of the additional injection on the temperature difference between the actual exhaust gas temperature and the setpoint exhaust gas temperature guarantees that there is only a minimal increase in consumption due to heating of the catalytic converter. This is equivalent to a low additional production of exhaust gas and/or pollutants due to heating of the catalytic converter.

According to an embodiment of the present invention, a minimum lambda value of the exhaust gas is defined, and the at least one additional injection after combustion is limited as a function of this minimum lambda value. This guarantees that the lambda value of the exhaust gas does not become too rich and thus does not have an excessively high pollutant content.

According to a second embodiment of the present invention, a fixed lambda value of the exhaust gas is specified, and the at least one additional injection after combustion is implemented as a function of this fixed lambda value, and the start of injection of the additional injection is altered. In this way, a specified lambda value of the exhaust gas is guaranteed. In order for the catalytic converter not to become overheated in any case, the start of injection of the additional injection may be varied if necessary.

It is also advantageous if the start of injection is varied as a function of the actual exhaust gas temperature. This makes it possible to achieve a control and/or regulation of the start of injection.

In another embodiment of the present invention, the number and/or times of the additional injections are selected so that the operating temperature of the catalytic converter does not drop below the setpoint and/or the catalytic converter is not overheated. The number and/or times may be determined in advance. Alternatively or additionally, it is possible to control and/or regulate the number and/or times as a function of the instantaneous temperature of the catalytic converter.

In addition, it is also possible for the temperature of the catalytic converter to be measured or modeled and for the additional injections to be implemented only when the temperature drops below a limit temperature. This permits fuel savings and a reduction in pollutant emissions.

The present invention may be applied in idling and/or in the second mode of operation of the engine. Idling is an operating point at which a low exhaust gas temperature may occur and at which the catalytic converter may therefore drop below its operating temperature. Idling is usually implemented in stratified charge operation in an internal combustion engine having direct injection. The method according to the present invention may therefore be used in stratified charge operation and in idling of the engine.

The method according to the present invention may be implemented using a control element provided for a control unit of an internal combustion engine in a motor vehicle. A program capable of running on a computer, in particular on a microprocessor, and suitable for execution of the method according to the present invention may be stored on this control element. An electric memory medium such as a read-only memory or a flash memory in particular may be used as the control element.

BRIEF DESCRIPTION OF THE DRAWING

FIG. 1 shows a schematic diagram of an exemplary embodiment of an engine according to the present invention.

DETAILED DESCRIPTION

FIG. 1 shows an internal combustion engine 1 of a motor vehicle in which a piston 2 is movable back and forth in a cylinder 3. Cylinder 3 is equipped with a combustion chamber 4 delimited by piston 2, an intake valve 5, and an exhaust valve 6, among other things. An intake manifold 7 is connected to intake valve 5, and an exhaust pipe 8 is connected to exhaust valve 6.

A fuel injector 9 and a spark plug 10 protrude into combustion chamber 4 in the area of intake valve 5 and exhaust valve 6. Fuel may be injected into combustion chamber 4 through injector 9. Fuel in combustion chamber 4 is ignitable by spark plug 10.

Engine 1 has a plurality of such cylinders 3 and the respective combustion chambers 4, pistons 2, intake valves 5, and outlet valves 6. An injector 9 and a spark plug 10 are also assigned to each cylinder 3.

A rotatable throttle valve 11 through which air may be supplied to intake manifold 7 is installed in intake manifold 7. The amount of air supplied depends on the angular position of throttle valve 11. A catalytic converter 12 is installed in exhaust pipe 8 to purify the exhaust gas formed by combustion of fuel.

Catalytic converter 12 in the present embodiment is a storage catalytic converter 12' which is combined with a three-way catalytic converter 12". Catalytic converter 12 is provided among other things to store nitrogen oxides (NOx) and to temporarily and convert them as well as hydrocarbons (HC). For conversion, it is necessary for catalytic converter 12 to have an operating temperature of at least approx. 350 degrees Celsius. Below this operating temperature, there is incomplete conversion or none at all.

A control unit 18 receives input signals 19 representing operating variables of engine 1 measured by sensors. Control unit 18 generates output signals 20 using which the performance of engine 1 may be influenced via actuators. Among other things, control unit 18 is provided for controlling and/or regulating the operating variables of engine 1. To this end, control unit 18 is equipped with a microprocessor which has a program suitable for execution of this control and/or regulation stored in a memory medium, in particular in a flash memory.

In a first mode of operation, referred to as homogeneous operation of engine 1, throttle valve 11 is partially opened or closed as a function of the desired torque. Fuel is injected by injector 9 into combustion chamber 4 during an intake phase produced by piston 2. Turbulence is created in the injected fuel due to the simultaneous air intake through throttle valve 11 and thus fuel is distributed generally uniformly in combustion chamber 4. Then the fuel/air mixture is compressed during the compression phase and ignited by spark plug 10. Expansion of ignited fuel drives piston 2. The resulting torque in homogeneous operation depends on the position of throttle valve 11, among other factors. From the standpoint of low emissions, the fuel/air mixture is set as closely as possible to a lambda value of one.

In a second mode of operation, referred to as stratified charge operation of engine 1, throttle valve 11 is wide open. Fuel is injected into combustion chamber 4 by injector 9 during a compression phase produced by piston 2 in the immediate vicinity of spark plug 10 and at a suitable interval before the ignition time. Then the fuel is ignited using the spark plug 10, so that piston 2 is driven by the expansion of the ignited fuel in the following working phase. The resulting torque in stratified charge operation depends largely on the fuel mass injected. Stratified charge operation is provided generally for idling operation and partial load operation of engine 1.

Operation of engine 1 in which fuel is burned in combustion chambers 4 in homogeneous operation or in stratified charge operation results in formation of exhaust gases which are sent to catalytic converter 12. The resulting conversion of the exhaust gases is an exothermic reaction which results in heating of catalytic converter 12. Due to this heating, catalytic converter 12 generally retains an operating temperature required for conversion.

In control and/or regulation of engine 1 by control unit 18, there are operating points in homogeneous operation and in particular in stratified charge operation at which engine 1 generates only a low exhaust gas temperature. This low exhaust gas temperature may result in the operating temperature of catalytic converter 12 dropping below or not reaching the operating temperature required for conversion. This would have a negative effect on the exhaust gas purification.

To prevent such cooling of catalytic converter 12, at an operating point having a low exhaust gas temperature, at least one additional injection is performed after combustion, i.e., in the expansion phase, in stratified charge operation of the engine. This additional injection, which may also be referred to as double injection, goes without burning into exhaust pipe 8 and to catalytic converter 12, where the additionally injected fuel is burned on hot exhaust pipe 8 and/or on catalytic converter 12 which is still hot. This combustion produces heat, which prevents cooling of catalytic converter 12.

The number and/or times of such double injections may be selected by control unit 18 in such a way that the operating temperature of catalytic converter 12 does not drop below the operating temperature required for conversion, and simultaneously avoids overheating of catalytic converter 12.

To do so, a setpoint exhaust gas temperature is defined by control unit 18; it may correspond to the required operating temperature of catalytic converter 12 or to a somewhat higher limit temperature of 400 degrees Celsius, for example, which may be stored in an engine characteristics map. This setpoint exhaust gas temperature is compared with the actual exhaust gas temperature which is measured by a temperature sensor 13 associated with catalytic converter 12 or modeled from other operating variables of engine 1.

The temperature difference thus determined is weighted with a conversion factor which corresponds to the heating energy of the fuel. Likewise, the temperature difference is weighted with an energy conversion efficiency allowing the energy conversion in engine 1 to be taken accounted for. This efficiency may be stored in an engine characteristics map, which depends on the air mass supplied and/or the rotational speed of engine 1 and/or the injection time of the injected fuel. As a result, this yields the fuel mass for increasing the actual exhaust gas temperature by the temperature difference thus determined to the setpoint exhaust gas temperature, i.e., to heat catalytic converter 12.

In order for the lambda value in the exhaust not to be too low, i.e., too rich, a minimal lambda value of the exhaust gas is specified. The instantaneous total value of the fuel mass to be supplied is determined from this minimum lambda value and the instantaneous air mass intake by engine 1. The fuel mass injected through injector 9 to produce the torque is subtracted from this instantaneous total value. Likewise, additional fuel mass, e.g., originating from a tank vent, is subtracted if appropriate. The remaining fuel mass then represents a maximum value of the fuel mass to be supplied after combustion for heating catalytic converter 12.

As an alternative, it is possible for a lambda value of the exhaust gas to be specified as a fixed value. Then a remaining fuel mass may be determined from this lambda value, as explained above, although in this case it does not represent a maximum value, but instead it is exactly the fuel mass supplied to engine 1 for heating catalytic converter 12. To maintain the desired actual exhaust gas temperature, in particular to prevent overheating of catalytic converter 12, it is possible to provide for the start of injection of the additional injection to be modified accordingly in the expansion phase. This modification may be controlled and/or regulated with the help of temperature sensor 13 or the modeled temperature.

In both procedures, i.e., when the lambda value is fixed or limited, an additional fuel mass may be subtracted from the total value thus determined if the fuel mass supplied to engine 1 for heating catalytic converter 12 makes a contribution to the torque of engine 1.

Idling of engine 1 represents an operating point having a low exhaust gas temperature. The procedures described above are therefore implemented by control unit 18 particularly during idling of engine 1. In the case of the internal combustion engine having direct injection described here, idling may be implemented in stratified charge operation.

Optionally, e.g., during warm-up of the engine, however, idling may also be implemented in homogeneous operation. In this case, the method described here may also be applied accordingly.

What is claimed is:

1. A method of operating an internal combustion engine which includes a combustion chamber and a catalytic converter for receiving exhaust gases, the method comprising:
    injecting fuel into the combustion chamber during one of:
        (a) an intake phase in a first mode of operation, and
        (b) a compression phase in a second mode of operation;
    determining a temperature difference between an actual exhaust gas temperature and a setpoint exhaust gas temperature at an operating point of the engine having a low exhaust gas temperature;
    inducing at least one additional injection after combustion as a function of the temperature difference;
    specifying a minimum lambda value of the exhaust gas; and
    limiting an amount of the at least one additional injection after combustion as a function of the minimum lambda value.

2. The method of claim 1, wherein the internal combustion engine is incorporated in a motor vehicle.

3. A method of operating an internal combustion engine which includes a combustion chamber and a catalytic converter for receiving exhaust gases, the method comprising:
    injecting fuel into the combustion chamber during one of:
        (a) an intake phase in a first mode of operation, and
        (b) a compression phase in a second mode of operation;
    determining a temperature difference between an actual exhaust gas temperature and a setpoint exhaust gas temperature at an operating point having a low exhaust gas temperature;
    inducing at least one additional injection after combustion as a function of the temperature difference;
    specifying a fixed lambda value of the exhaust gas;
    setting an amount of the at least one additional injection after combustion as a function of the fixed lambda value; and
    modifying a start of injection of the at least one additional injection.

4. The method of claim 3 wherein the internal combustion engine is incorporated in a motor vehicle.

5. The method of claim 3, further comprising:
    modifying a start of injection as a function of the actual exhaust gas temperature.

6. The method of claim 1, further comprising:
    selecting at least one of: i) a number of the at least one additional injection, and ii) times of the at least one additional injection, so that at least one of the following:
    the catalytic converter does not drop below an operating temperature, and
    the catalytic converter does not overheat.

7. The method of claim 1, wherein the method is implemented during an idling of the internal combustion engine.

8. The method of claim 1, further comprising:
    injecting fuel into the combustion chamber of the engine during the second mode of operation of the internal combustion engine.

9. A control element for a control unit of an internal combustion engine, the internal combustion engine including a combustion chamber and a catalytic converter for receiving exhaust gases, the control element comprising:
    a storage element adapted to store a program having instructions for directing the control unit to control and execute:
        injection of fuel into the combustion chamber during one of:
            (a) an intake phase in a first mode of operation of the engine, and
            (b) a compression phase in a second mode of operation of the engine,
        determination of a temperature difference between an actual exhaust gas temperature and a setpoint exhaust gas temperature at an operating point of the engine having a low exhaust gas temperature,
        provision of at least one additional injection after combustion as a function of the temperature difference,
        specification of a minimum lambda value of the exhaust gas, and
        limitation of an amount of the at least one additional injection after combustion as a function of the minimum lambda value.

10. The control element of claim 9, wherein the control element includes flash memory, the program stored on the control element is executable using a microprocessor and the internal combustion engine is incorporated in a motor vehicle.

11. A control unit for an internal combustion engine, the internal combustion engine including a combustion chamber and a catalytic converter for receiving exhaust gases, the control unit comprising:
    a processor configured to control:
        injection of fuel into the combustion chamber during one of:
            (a) an intake phase in a first mode of operation of the engine, and
            (b) a compression phase in a second mode of operation of the engine,
        determination of a temperature difference between an actual exhaust gas temperature and a setpoint exhaust gas temperature at an operating point having a low exhaust gas temperature,
        implementation of at least one additional injection after combustion as a function of the temperature difference,
        specification of a minimum lambda value of the exhaust gas, limitation of an amount of the at least one additional injection after combustion as a function of the minimum lambda value.

12. The control unit of claim 11, wherein the internal combustion engine is incorporated in a motor vehicle.

13. An internal combustion engine, comprising:
a combustion chamber in which fuel may be injected during one of:
an intake phase in a first mode of operation, and
a compression phase in a second mode of operation;
a catalytic converter for receiving exhaust gases; and
a control unit, the control unit configured to determine a temperature difference between an actual exhaust gas temperature and a setpoint exhaust gas temperature at an operating point having a low exhaust gas temperature, and to induce at least one additional injection after combustion as a function of the temperature difference;
wherein a minimum lambda value of the exhaust gas is specified and the control unit limits an amount of the at least one additional injection after combustion as a function of the minimum lambda value.

14. The internal combustion engine of claim 13, wherein the internal combustion engine is incorporated in a motor vehicle.

15. A control unit for an internal combustion engine, the internal combustion engine including a combustion chamber and a catalytic converter for processing exhaust gases, the control unit comprising:
a processor configured to control:
injection of fuel into the combustion chamber during one of:
a) an intake phase in a first mode of operation of the engine, and
b) a compression phase in a second mode of operation of the engine,
determination of a temperature difference between an actual exhaust gas temperature and a setpoint exhaust gas temperature at an operating point having a low exhaust gas temperature,
a setting of an amount of at least one additional injection after combustion as a function of the temperature difference,
specification of a fixed lambda value,
implementation of the at least one additional injection after a combustion as a function of the fixed lambda value, and modification of a start of injection of the at least one additional injection.

16. The control unit of claim 15, wherein the internal combustion engine is incorporated in a motor vehicle.

17. An internal combustion engine for a motor vehicle comprising:
a combustion chamber in which fuel may be injected during one of an intake phase in a first mode of operation and a compression phase in a second mode of operation;
a catalytic converter configured to receive exhaust gases;
a control unit configured to determine a temperature difference between an actual exhaust gas temperature and a setpoint exhaust gas temperature at an operating point having a low exhaust gas temperature, and implementing at least one additional injection after combustion as a function of the temperature difference;
wherein a fixed lambda value of the exhaust gas is specified, the control unit sets an amount of the at least one additional injection after combustion as a function of the fixed lambda value, and modifies the start of injection of the at least one additional injection.

18. A control unit for an internal combustion engine, the internal combustion engine including a combustion chamber and a catalytic converter for receiving exhaust gases, the control unit comprising:
a processor configured to control:
injection of fuel into the combustion chamber during one of:
(a) an intake phase in a first mode of operation, and
(b) a compression phase in a second mode of operation;
determination of a temperature difference between an actual exhaust gas temperature and a setpoint exhaust gas temperature at an operating point having a low exhaust gas temperature;
an inducing of at least one additional injection after combustion as a function of the temperature difference;
a specifying of a fixed lambda value of the exhaust gas;
a setting an amount of the at least one additional injection after combustion as a function of the fixed lambda value; and
a modification of a start of injection of the at least one additional injection.

* * * * *